United States Patent
Ma et al.

(10) Patent No.: US 12,242,250 B2
(45) Date of Patent: *Mar. 4, 2025

(54) AUTOSCALING STRATEGIES FOR ROBOTIC PROCESS AUTOMATION

(71) Applicant: UiPath, Inc., New York, NY (US)

(72) Inventors: Tao Ma, Bellevue, WA (US); Bogdan Constantin Ripa, Bucharest (RO); Andrei Robert Oros, Timisoara (RO); Cristian Pufu, Bucharest (RO); Clement B. Fauchere, Sammamish, WA (US); Tarek Madkour, Sammamish, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,987

(22) Filed: Feb. 14, 2024

(65) Prior Publication Data

US 2024/0184271 A1     Jun. 6, 2024

Related U.S. Application Data

(63) Continuation of application No. 17/228,741, filed on Apr. 13, 2021, now Pat. No. 11,971,705.

(51) Int. Cl.
*G05B 19/418* (2006.01)
*G06N 20/00* (2019.01)

(52) U.S. Cl.
CPC .  *G05B 19/41825* (2013.01); *G05B 19/41835* (2013.01); *G06N 20/00* (2019.01)

(58) Field of Classification Search
CPC ........ G05B 19/41825; G05B 19/41835; G06F 9/5005; G06N 20/00

USPC .................................................. 700/275–306

See application file for complete search history.

(56) References Cited

U.S. PATENT DOCUMENTS

| | | | |
|---|---|---|---|
| 7,712,100 B2 * | 5/2010 | Fellenstein ........... | G06F 9/5072 705/37 |
| 8,825,550 B2 | 9/2014 | Marr et al. | |
| 9,239,996 B2 | 1/2016 | Moorthi et al. | |
| 9,386,086 B2 | 7/2016 | Fenoglio et al. | |
| 9,571,347 B2 | 2/2017 | Siddiqui et al. | |
| 10,607,155 B2 * | 3/2020 | Shen ..................... | G06F 9/5038 |

(Continued)

OTHER PUBLICATIONS

Dautov, Rustem, and Salvatore Distefano. "Automating IoT data-intensive application allocation in clustered edge computing." IEEE Transactions on Knowledge and Data Engineering 33.1 (2019): pp. 55-69. (Year: 2019).*

(Continued)

*Primary Examiner* — Satish Rampuria
(74) *Attorney, Agent, or Firm* — Chiesa Shahinian & Giantomasi PC

(57) ABSTRACT

Systems and methods for allocating computing environments for completing an RPA (robotic process automation) workload are provided. A request for completing an RPA workload is received. A number of computing environments to allocate for completing the RPA workload is calculated based on a selected one of a plurality of RPA autoscaling strategies. The calculated number of computing environments is allocated for allocating one or more RPA robots to complete the RPA workload. The computing environments may be virtual machines.

20 Claims, 6 Drawing Sheets

(56) References Cited

U.S. PATENT DOCUMENTS

| | | | |
|---|---|---|---|
| 10,860,007 | B2 | 12/2020 | Haberkern et al. |
| 10,938,893 | B2 | 3/2021 | Moss et al. |
| 11,093,146 | B2 | 8/2021 | Karr et al. |
| 11,256,547 | B2 | 2/2022 | Casotto |
| 11,354,164 | B1 | 6/2022 | Dennis et al. |
| 11,550,514 | B2 | 1/2023 | Karr et al. |
| 11,797,569 | B2 | 10/2023 | Grunwald et al. |
| 2018/0285169 | A1 | 10/2018 | Noguchi et al. |
| 2019/0164080 | A1 | 5/2019 | Stefani et al. |
| 2020/0089521 | A1 | 3/2020 | Padala et al. |
| 2020/0175456 | A1* | 6/2020 | Dar Mousa ............ G06Q 10/04 |

OTHER PUBLICATIONS

Liu, Xunyun, and Rajkumar Buyya. "Resource management and scheduling in distributed stream processing systems: a taxonomy, review, and future directions." ACM Computing Surveys (CSUR) 53.3 (2020): pp. 1-41. (Year: 2020).*

Kattepur, Ajay. "Towards structured performance analysis of industry 4.0 workflow automation resources." Proceedings of the 2019 ACM/SPEC International Conference on Performance Engineering. 2019. pp. 189-196. (Year: 2019).*

Anushree, B., and VM Arul Xavier. "Comparative analysis of latest task scheduling techniques in cloud computing environment." 2018 Second International Conference on Computing Methodologies and Communication (ICCMC). IEEE, 2018.pp. 608-611 (Year: 2018).

Leshob, Abderrahmane, Audrey Bourgouin, and Laurent Renard. "Towards a process analysis approach to adopt robotic process automation." 2018 IEEE 15th international conference on e-business engineering (ICEBE). IEEE, 2018.pp. 46-53. (Year: 2018).

Shriyam, Shaurya, and Satyandra K. Gupta. "Incorporation of contingency tasks in task allocation for multi robot teams." IEEE Transactions on Automation Science and Engineering 17.2 (2019): pp. 809-822. (Year: 2019).

Jamshidi, Pooyan, et al. "Fuzzy self-learning controllers for elasticity management in dynamic cloud architectures." 2016 12th International ACM SIGSOFT Conference on Quality of Software Architectures (QoSA). IEEE, 2016.pp. 70-79 (Year: 2016).

Danca, Ionut-Catalin, et al. "Autoscaled rabbitmq kubernetes cluster on single-board computers." 2020 IEEE International Conference on Automation, Quality and Testing, Robotics (AQTR). IEEE, 2020.pp. 1-6 (Year: 2020).

Mahmud, Redowan, Kotagiri Ramamohanarao, and Rajkumar Buyya. "Application management in fog computing environments: A taxonomy, review and future directions." ACM Computing Surveys (CSUR) 53.4 (2020): 1-43. (Year: 2020).

International Search Report and Written Opinion mailed Feb. 21, 2022, in connection with International Patent Application No. PCT/US2021/072099, filed Oct. 29, 2021, 10 pgs.

Dougherty et al., "Model-driven auto-scaling of green cloud computing infrastructure," 2012, Future Generation Computer Systems, vol. 28, Issue 2, pp. 371-378.

Uarvi, "Cloud Resource Allocation in Robotic Process Automation—Orchestrator Framework," 2020, In: thesis submitted for examination for the degree of Master of Science in Technology, Aalto University School of Electrical Engineering, 84 pgs.

Chappell, "Understanding RPA Scalability: The Blue Prism Example," 2018, 10 pgs.

Amazon Web Services, Inc., "AWS Auto Scaling User Guide," (Step 2: Specify the scaling strategy) retrieved online on Mar. 23, 2021, from: https://docs.aws.amazon.com/autoscaling/plans/userguide/as-plans-ug.pdf#gs-configure-Scaling-plan, 39 pgs.

Uipath, Inc., "UiPath Unattended Robots Auto Scaling," Oct. 5, 2020, retrieved from: https://marketplace.uipath.oom/listings/uipath-unattended-robots-auto-scaling, 5 pgs.

* cited by examiner

AUTOSCALING STRATEGIES FOR ROBOTIC PROCESS AUTOMATION

CROSS-REFERENCE TO RELATED APPLICATIONS

This application is a continuation of U.S. patent application Ser. No. 17/228,741, filed Apr. 13, 2021, the disclosure of which is herein incorporated by reference in its entirety.

TECHNICAL FIELD

The present invention relates generally to robotic process automation (RPA), and more particularly to RPA autoscaling strategies for allocating virtual machines or other computing environments to execute one or more RPA robots.

BACKGROUND

In robotic process automation (RPA), jobs are completed by one or more RPA robots automatically executing RPA workflows. Often times, such jobs may need to be completed with a priority on speed or cost. Conventionally, machines for implementing RPA robots are manually allocated by a user. However, the manual allocation of machines is cumbersome and requires the user to know various contextual information relating to the implementation of RPA to prioritize speed or costs. In another conventional approach, the machines for implementing RPA robots are allocated based on computing resources such as central processing unit (CPU) usage, memory usage, etc. However, such conventional approaches do not consider the workloads of the robots, such as pending jobs.

BRIEF SUMMARY OF THE INVENTION

Embodiments of the present invention provide for RPA (robotic process automation) autoscaling strategies for allocating virtual machines or other computing environments to balance speed and costs for completing jobs.

In accordance with one or more embodiments, systems and methods for allocating computing environments for completing an RPA workload are provided. A request for completing the RPA workload is received. A number of computing environments to allocate for completing the RPA workload is calculated based on a selected one of a plurality of RPA autoscaling strategies. The calculated number of computing environments is allocated for allocating one or more RPA robots to complete the RPA workload.

In one embodiment, the computing environments comprise virtual machine.

In one embodiment, the plurality of RPA autoscaling strategies comprises a speed over cost strategy, a balanced strategy, and a cost over speed strategy. The number of computing environments to allocate is calculated based on a number of computing environments that would complete the RPA workload, a maximum number of computing environments that can be created in a pool, and a number of RPA robots allowed by a license.

In one embodiment, the plurality of RPA autoscaling strategies comprises a custom strategy in which a user configures one or more control variables. In another embodiment, the plurality of RPA autoscaling strategies comprises a dynamic strategy in which one or more control variables are automatically adjusted based on workload type.

In one embodiment, a selection of the selected RPA autoscaling strategy is received from a user. In another embodiment, the selected RPA autoscaling strategy is automatically selected according to a schedule and/or based on a source of the RPA workload.

These and other advantages of the invention will be apparent to those of ordinary skill in the art by reference to the following detailed description and the accompanying drawings.

DETAILED DESCRIPTION

Figure 1:
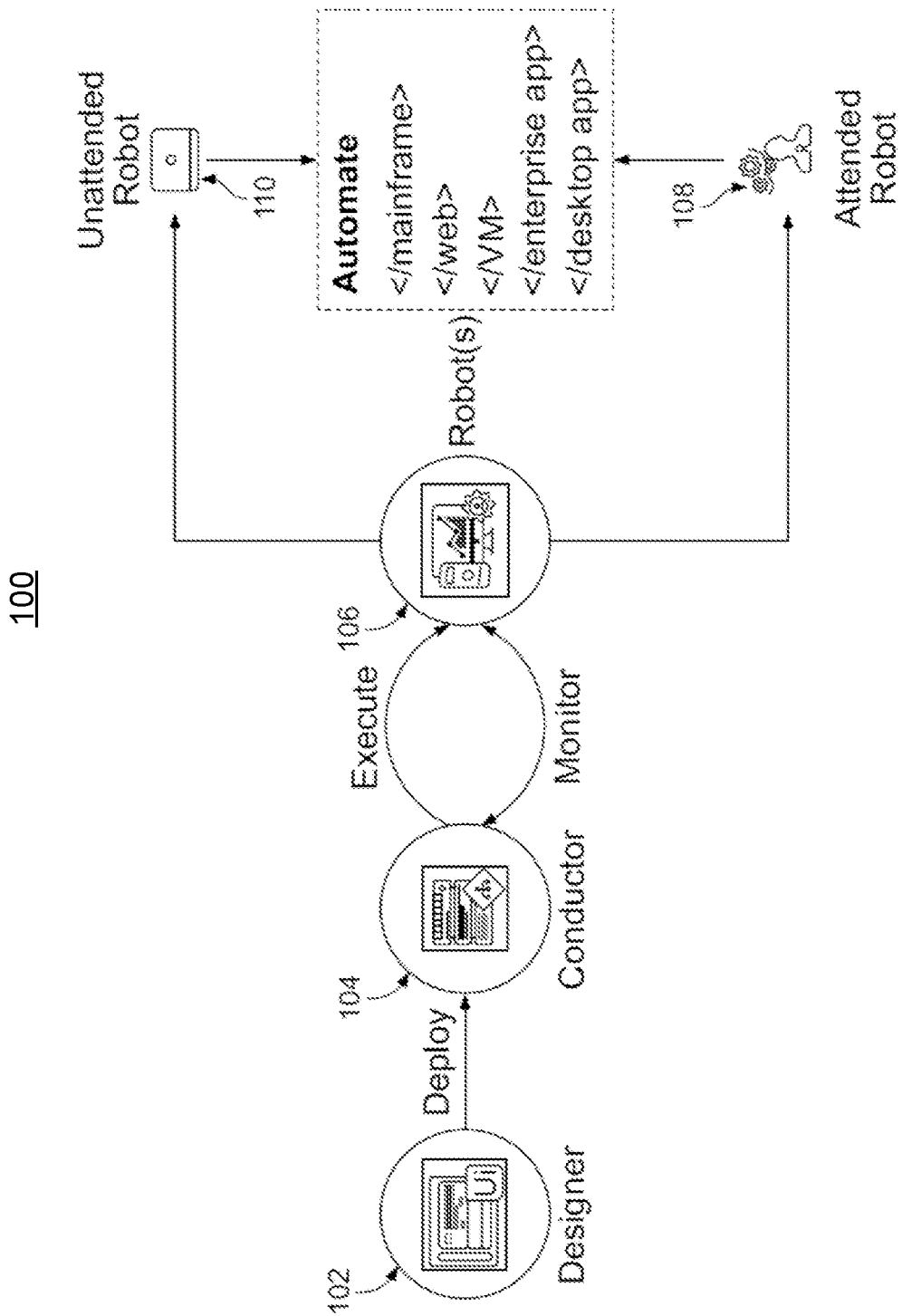
FIG. 1 is an architectural diagram illustrating an RPA (robotic process automation) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
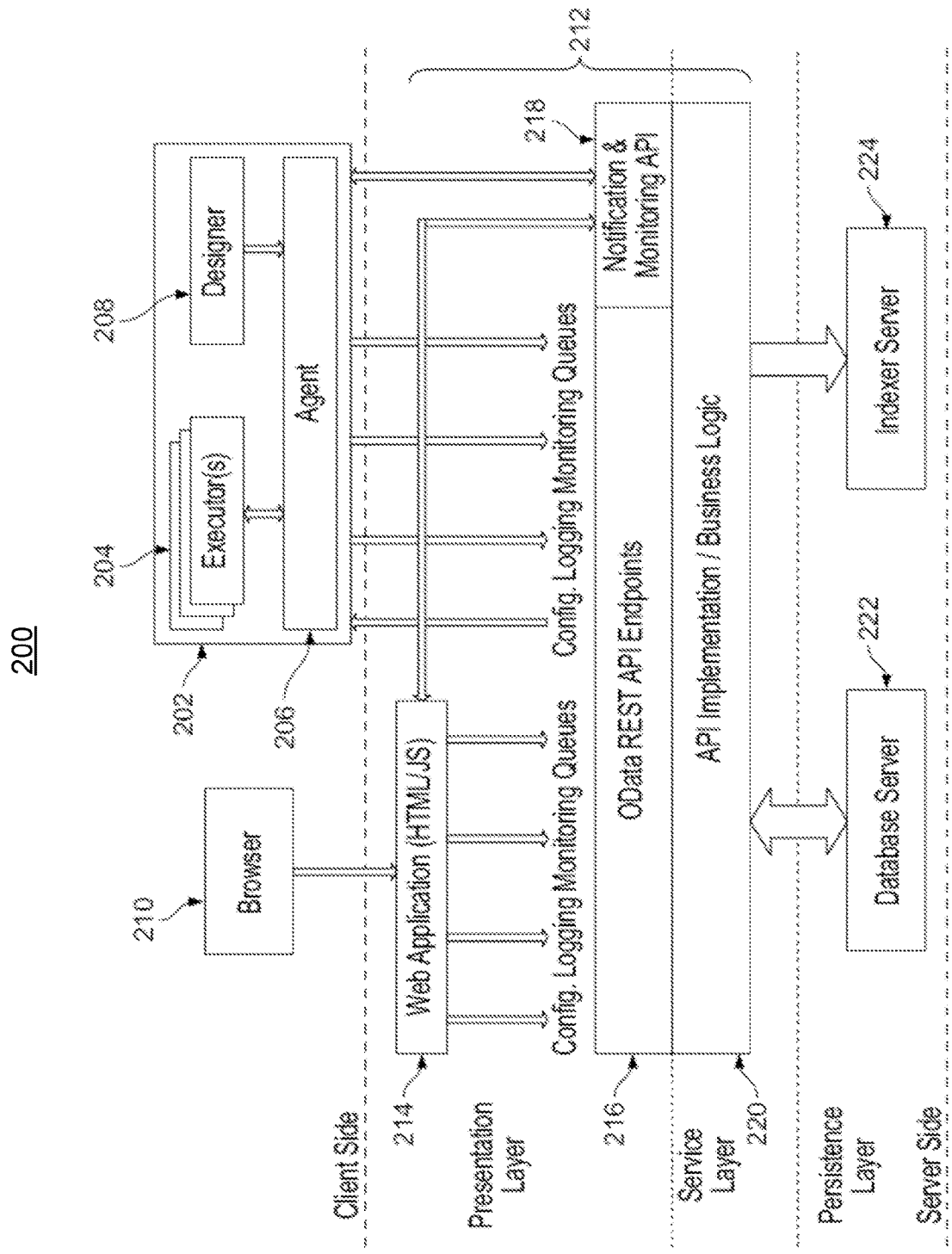
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
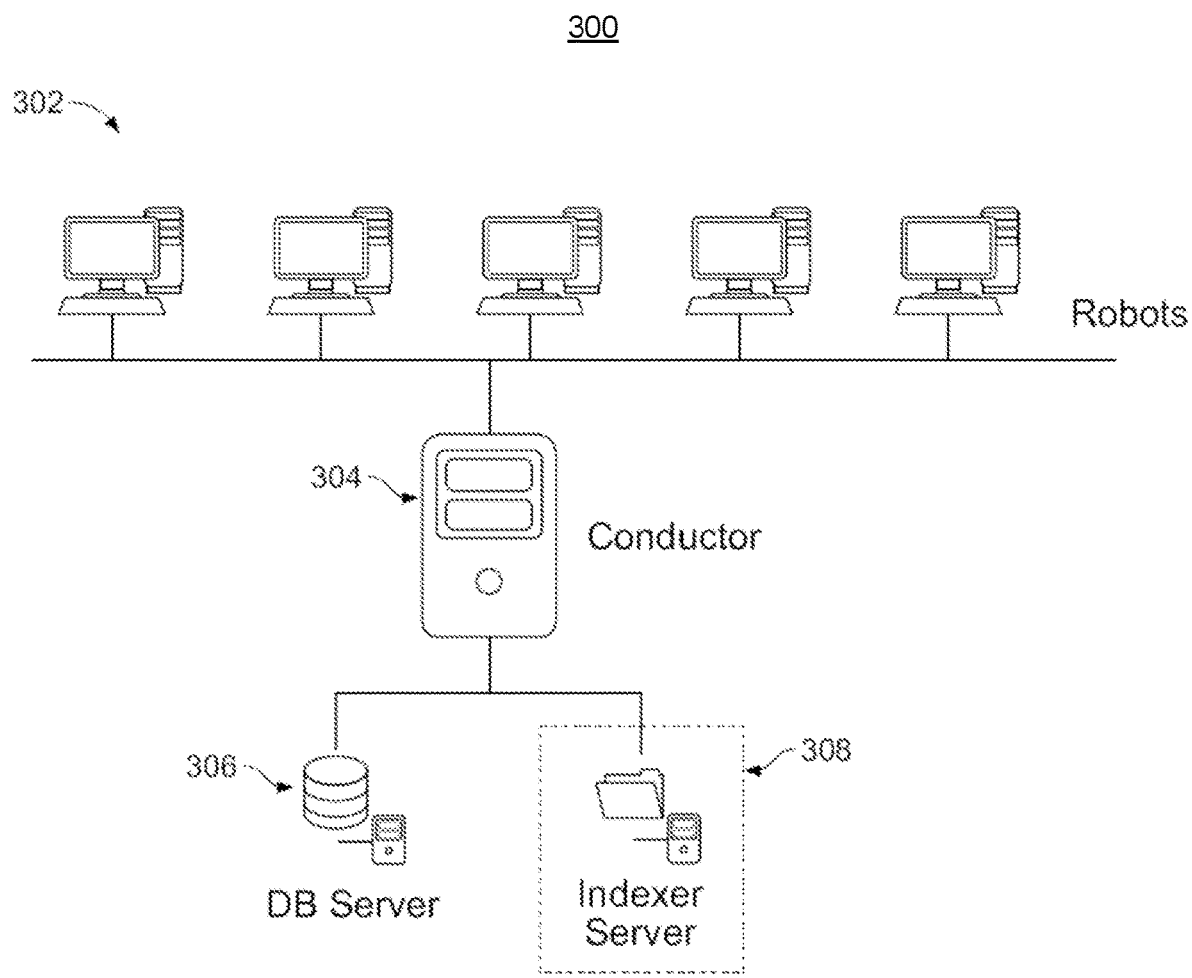
FIG. 3 is an architectural diagram illustrating a simplified deployment example of an RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of Figure may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
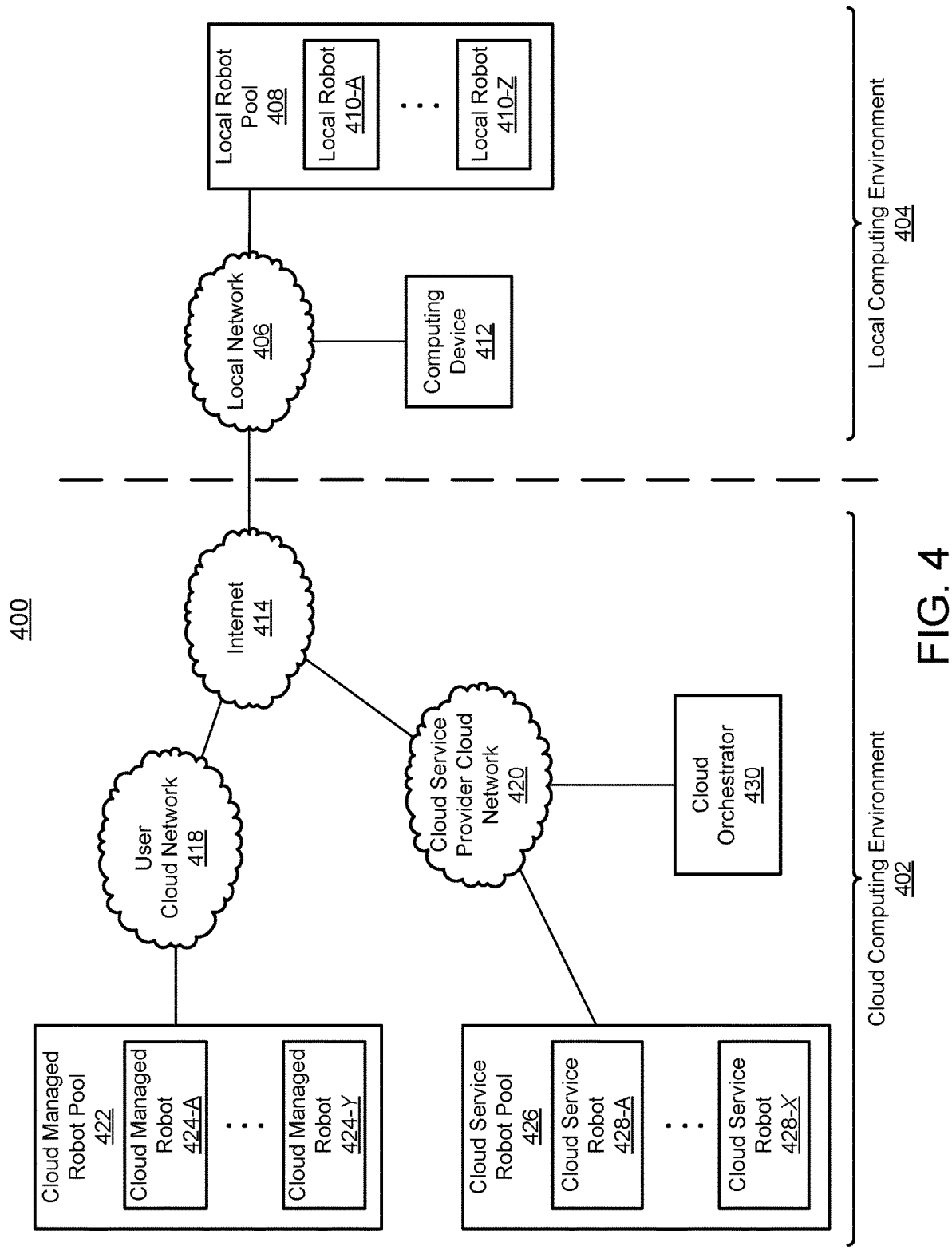
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments. Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, ..., 428-X (hereinafter collectively referred to as cloud service robots 428) of cloud service robot pool 426 and one or more cloud managed robots 424-A, ..., 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, ..., 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

In operation, an RPA system, such as, e.g., RPA system 100 of FIG. 1, RPA system 200 of FIG. 2, RPA system 300 of FIG. 3, and/or cloud RPA system 400 of FIG. 4, is configured to complete jobs. Such jobs are completed by one or more RPA robots executing or running on a virtual machine (or any other computing environment) to execute one or more RPA workflows. A virtual machine is a virtualization or emulation of a computer system that is executed on another computer system. At times, it may be desirable to complete the RPA jobs by prioritizing time, cost, or a balance between time and cost. Embodiments described herein provide for RPA autoscaling strategies for prioritizing time, cost, or a balance between time. Advantageously, computing environments are allocated for running one or more RPA robots to complete the jobs based on a selected RPA autoscaling strategy, thereby completing the jobs in accordance with the prioritized time, cost, or balance with minimal manual user configuration.

Figure 5:
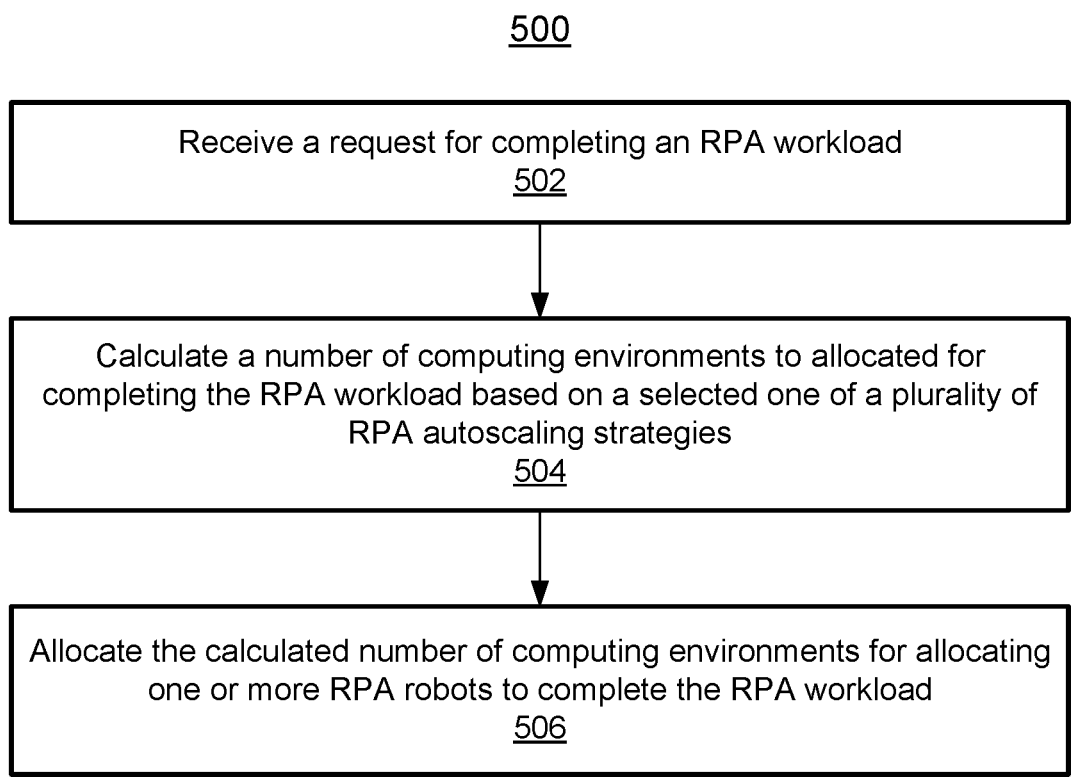
FIG. 5 shows a method for allocating computing environments for executing RPA robots, according to an embodiment of the invention.

FIG. 5 shows a method 500 for allocating computing environments for executing RPA robots, in accordance with one or more embodiments. The steps of method 500 may be performed by one or more suitable computing devices, such as, e.g., computing system 600 of FIG. 6. In one embodiment, the steps of method 500 are performed by an orchestrator or conductor of an RPA system, such as, e.g., conductor 104 of RPA system 100 of FIG. 1, conductor 212 of RPA system 200 of FIG. 2, conductor 304 of RPA system 300 of FIG. 3, or cloud orchestrator 430 of cloud RPA system 400 of FIG. 4.

At step 502, a request for completing an RPA workload is received. The RPA workload may be, for example, a set of RPA jobs.

At step 504, a number of computing environments to allocate for completing the RPA workload is calculated based on a selected one of a plurality of RPA autoscaling strategies. In one embodiment, the computing environments are virtual machine. However, the computing environments may be any other suitable computing environments for executing RPA robots, such as, e.g., virtualized desktop environments, containers, etc. The RPA autoscaling strategies can be defined or implemented in multiple ways, for example, as RPA autoscaling profiles.

The plurality of RPA autoscaling strategies balance time and cost for completing the RPA workload. In one embodiment, the plurality of RPA autoscaling strategies comprises a speed over cost strategy, a balanced strategy, and a cost over speed strategy. The speed over cost strategy has the fastest time for completing the RPA workload, but the highest infrastructure cost. The balanced strategy has a medium time for completing the RPA workload and medium infrastructure cost. The cost over speed strategy has a slowest time for completing the RPA workload, but the lowest infrastructure cost. In one embodiment, the cost over speed strategy is the default strategy.

The number of computing environments to allocate is determined based on the selected autoscaling strategy according to various control variables or parameters. In one embodiment, the number of computing environments to allocate is determined according to the selected autoscaling strategy based on 1) MAX_MACHINES_FOR_WORKLOAD representing the number of computing environments that would complete the RPA workload, 2) MAX_MACHINES representing the maximum number of computing environments in the pool and 3) LICENSED_ROBOTS representing the number of active RPA robots allowed by a license.

For the speed over cost strategy, the number of computing environments to allocate ALLOCATION_MACHINE_COUNT is calculated as:

$$ALLOCATION\_MACHINE\_COUNT = \min(MAX\_MACHINES\_FOR\_WORKLOAD, MAX\_MACHINES)/X$$

where the control variable X is any positive integer (e.g., 2), MAX_MACHINES is defined to be the maximum number of computing environments in the pool, MIN_MACHINES is defined to be 1, MACHINE_IDLE is defined to be 30 minutes, and MACHINE_DELETE is defined to be Z minutes. For the balanced strategy, the number of computing environments to allocate ALLOCATION_MACHINE_COUNT is calculated as:

$$ALLOCATION\_MACHINE\_COUNT = \min(MAX\_MACHINES\_FOR\_WORKLOAD, MAX\_MACHINES)/Y$$

where the control variable Y is any positive integer greater than X (e.g., 4), MAX_MACHINES is defined to be the maximum number of computing environments in the pool, MIN_MACHINES is defined to be 0, MACHINE_IDLE is defined to be 10 minutes, and MACHINE_DELETE is defined to be Z minutes. For the cost over speed strategy, the number of computing environments to allocate ALLOCATION_MACHINE_COUNT is defined as:

$$ALLOCATION\_MACHINE\_COUNT = 1$$

where the control variable MAX_MACHINES is defined to be the maximum number of computing environments in the pool, MIN_MACHINES is defined to be 0, MACHINE_IDLE is defined to be 3 minutes, and MACHINE_DELETE is defined to be Z minutes.

The number of computing environments to allocate is calculated by calculating ALLOCATION_MACHINE_COUNT according to the formula associated with the selected RPA autoscaling strategy, with the calculated result being rounded up to the next whole number. In the above calculations, the control variable ALLOCATION_MACHINE_COUNT is the number of computing environments to allocate, the control variable MAX_MACHINES_FOR_WORKLOAD is the number of computing environments that would complete the RPA workload (taking into account state information such as, e.g., pending jobs, running jobs, licensed RPA robot runtimes, etc.), the control variable MAX_MACHINES is the maximum number of computing environments that can be created in a pool, the control variable MIN_MACHINES is the minimum number of computing environments that should remain available at all times (even when there are no pending jobs), the control variable MACHINE_IDLE is the amount of time to wait after a computing environment becomes idle before being put on standby, and the control variable MACHINE_DELETE is the amount of time to wait after a computing environment is deallocated before it is deleted.

It should be understood that other types of strategies may also be included in the plurality of RPA autoscaling strategies. In one example, the plurality of RPA autoscaling strategies may include one or more custom strategies in which a user configures one or more control variables to manually balance time and cost for completing the RPA workload. For instance, the custom strategy may allocate computing environments based on the formula associated with the speed over cost or the balanced strategy above according to a user defined value of X or Y. In another example, the plurality of RPA autoscaling strategies may include a dynamic strategy in which one or more control variables are automatically adjusted for balancing time and cost for completing the RPA workload based on, e.g., a workload type (e.g., an average execution time for the set of RPA jobs), internal constraints (e.g., the time for deploying a computing environment, the average time for completion of a job, the number of available RPA licenses), etc. For instance, a scheduler may monitor the pending jobs, computing resources, etc. and automatically adjust one or more control variables of the dynamic strategy. In some embodiment, the one or more control variables in the dynamic strategy are automatically adjusted using a machine learning based model.

In one embodiment, a selection of the selected RPA autoscaling strategy is received from a user, e.g., interacting with a user interface of an orchestrator of an RPA system. In another embodiment, the selected RPA autoscaling strategy is automatically selected. In one example, the selected RPA autoscaling strategy may be automatically selected according to a schedule defining start and end times for applying a selected RPA autoscaling strategy. For example, for an accounting company performing tax filings and document processing, the RPA workload increases at the end of each month and at the end of each quarter. The speed over cost strategy may be scheduled for the end of each month and at the end of each quarter and the cost over speed strategy may be scheduled for the remaining time periods. As another example, for a university processing student admission and graduation, the RPA workload increases for student on-boarding at the beginning of the school year for admission and student off-boarding at the end of the school year for graduation. The speed over cost strategy may be scheduled for the beginning and the end of the school year and the cost over speed strategy may be scheduled for the remaining time periods. In another example, the selected RPA autoscaling strategy may be automatically selected based on a source of the RPA workload. This allows a user to prioritize workloads received from certain sources so that they are processed faster by selecting the speed over cost strategy, while workloads received from other sources may be processed cost efficiently using the cost over speed strategy. As an example, for an IT (information technology) helpdesk, the speed over cost strategy may be selected for requests according to an SLA (service-level agreement) associated with the source or according to a business critical flag associated with the source, and a balanced strategy may be selected for all other requests.

At step 506, the calculated number of computing environments is allocated for allocating one or more RPA robots to complete the RPA workload.

Figure 6:
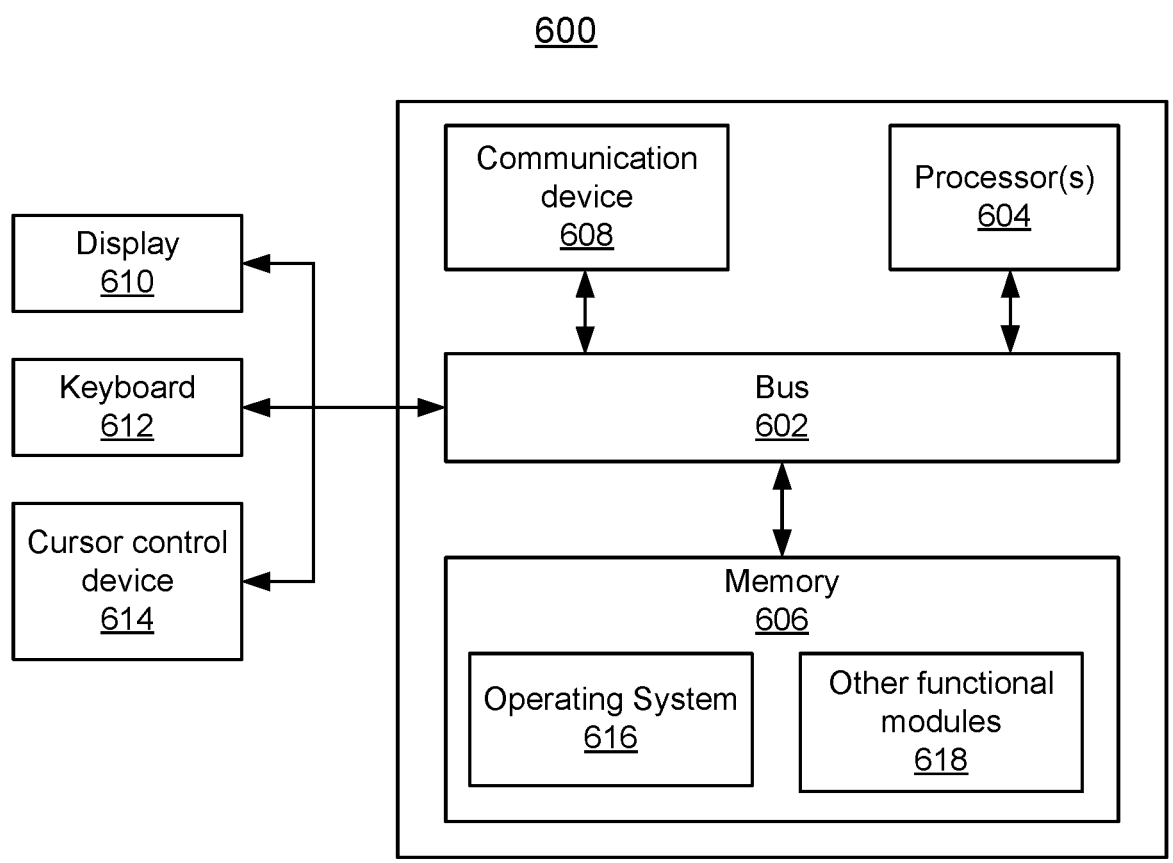
FIG. 6 is a block diagram of a computing system, which may be used to implemented embodiments of the invention.

FIG. 6 is a block diagram illustrating a computing system 600 configured to execute the methods, workflows, and processes described herein, including method 500 of FIG. 5, according to an embodiment of the present invention. In some embodiments, computing system 600 may be one or more of the computing systems depicted and/or described herein. Computing system 600 includes a bus 602 or other communication mechanism for communicating information, and processor(s) 604 coupled to bus 602 for processing information. Processor(s) 604 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 604 may also have multiple processing cores, and at least some of the cores may be configured to perform specific functions. Multi-parallel processing may be used in some embodiments.

Computing system 600 further includes a memory 606 for storing information and instructions to be executed by processor(s) 604. Memory 606 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 604 and may include volatile media, non-volatile media, or both. The media may also be removable, non-removable, or both.

Additionally, computing system 600 includes a communication device 608, such as a transceiver, to provide access to a communications network via a wireless and/or wired connection according to any currently existing or future-implemented communications standard and/or protocol.

Processor(s) 604 are further coupled via bus 602 to a display 610 that is suitable for displaying information to a user. Display 610 may also be configured as a touch display and/or any suitable haptic I/O device.

A keyboard 612 and a cursor control device 614, such as a computer mouse, a touchpad, etc., are further coupled to bus 602 to enable a user to interface with computing system. However, in certain embodiments, a physical keyboard and mouse may not be present, and the user may interact with the device solely through display 610 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 606 stores software modules that provide functionality when executed by processor(s) 604. The modules include an operating system 616 for computing system 600 and one or more additional functional modules 618 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
receiving a request for completing an RPA (robotic process automation) workload;
determining a number of computing environments to allocate for completing the RPA workload based on a selected one of a plurality of RPA autoscaling strategies, a number of computing environments that would complete the RPA workload, and a maximum number of computing environments;
allocating the determined number of computing environments for allocating one or more RPA robots to complete the RPA workload; and
completing the RPA workload by the one or more RPA robots using the allocated number of computing environments.

2. The computer-implemented method of claim 1, wherein the computing environments comprise virtual machines.

3. The computer-implemented method of claim 1, wherein the plurality of RPA autoscaling strategies comprises a speed over cost strategy, a balanced strategy, and a cost over speed strategy.

4. The computer-implemented method of claim 1, wherein the maximum number of computing environments comprises a maximum number of computing environments that can be created in a pool.

5. The computer-implemented method of claim 1, wherein the plurality of RPA autoscaling strategies comprises a custom strategy in which a user configures one or more control variables.

6. The computer-implemented method of claim 1, wherein the plurality of RPA autoscaling strategies comprises a dynamic strategy in which one or more control variables are automatically adjusted for balancing time and cost for completing the RPA workload.

7. The computer-implemented method of claim 1, further comprising:
receiving a selection of the selected RPA autoscaling strategy from a user.

8. The computer-implemented method of claim 1, further comprising:
automatically selecting the selected RPA autoscaling strategy according to a schedule defining start and end times for applying the selected RPA autoscaling strategy.

9. The computer-implemented method of claim 1, further comprising:
automatically selecting the selected RPA autoscaling strategy based on a source of the RPA workload.

10. An apparatus comprising:
a memory storing computer instructions; and
at least one processor configured to execute the computer instructions, the computer instructions configured to cause the at least one processor to perform operations of:
receiving a request for completing an RPA (robotic process automation) workload;
determining a number of computing environments to allocate for completing the RPA workload based on a selected one of a plurality of RPA autoscaling strategies, a number of computing environments that would complete the RPA workload, and a maximum number of computing environments;
allocating the determined number of computing environments for allocating one or more RPA robots to complete the RPA workload; and
completing the RPA workload by the one or more RPA robots using the allocated number of computing environments.

11. The apparatus of claim 10, wherein the computing environments comprise virtual machines.

12. The apparatus of claim 10, wherein the plurality of RPA autoscaling strategies comprises a speed over cost strategy, a balanced strategy, and a cost over speed strategy.

13. The apparatus of claim 10, wherein the maximum number of computing environments comprises a maximum number of computing environments that can be created in a pool.

14. The apparatus of claim 10, wherein the plurality of RPA autoscaling strategies comprises a custom strategy in which a user configures one or more control variables.

15. A non-transitory computer-readable medium storing computer program instructions, the computer program instructions, when executed on at least one processor, cause the at least one processor to perform operations comprising:
receiving a request for completing an RPA (robotic process automation) workload;
determining a number of computing environments to allocate for completing the RPA workload based on a selected one of a plurality of RPA autoscaling strategies, a number of computing environments that would complete the RPA workload, and a maximum number of computing environments;
allocating the determined number of computing environments for allocating one or more RPA robots to complete the RPA workload; and
completing the RPA workload by the one or more RPA robots using the allocated number of computing environments.

16. The non-transitory computer-readable medium of claim 15, wherein the computing environments comprise virtual machines.

17. The non-transitory computer-readable medium of claim 15, wherein the plurality of RPA autoscaling strategies comprises a dynamic strategy in which one or more control variables are automatically adjusted for balancing time and cost for completing the RPA workload.

18. The non-transitory computer-readable medium of claim 15, the operations further comprising:
receiving a selection of the selected RPA autoscaling strategy from a user.

19. The non-transitory computer-readable medium of claim 15, the operations further comprising:

automatically selecting the selected RPA autoscaling strategy according to a schedule defining start and end times for applying the selected RPA autoscaling strategy.

20. The non-transitory computer-readable medium of claim 15, the operations further comprising:
automatically selecting the selected RPA autoscaling strategy based on a source of the RPA workload.

* * * * *